Figure 1:
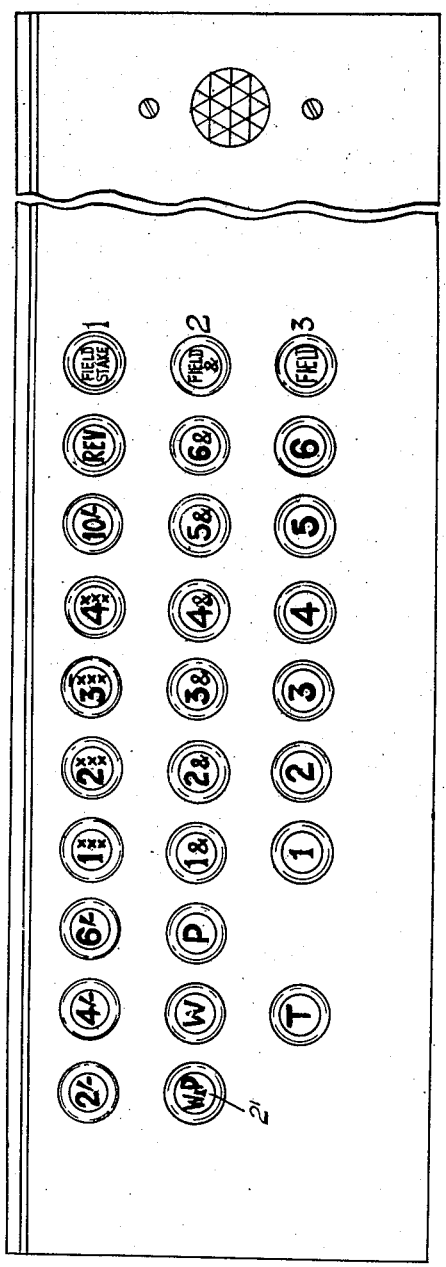

Aug. 25, 1953   J. HANDLEY   2,650,025
PLURAL COUNTER SELECTING AND OPERATING MEANS
Filed Nov. 13, 1948   5 Sheets-Sheet 1

Inventor
John Handley
by
Pennie, Edmonds, Morton and Barrows
Attorneys

Aug. 25, 1953    J. HANDLEY    2,650,025
PLURAL COUNTER SELECTING AND OPERATING MEANS
Filed Nov. 13, 1948    5 Sheets-Sheet 2

Inventor
John Handley
by
Pennie, Edmonds, Morton and Barrows
Attorneys

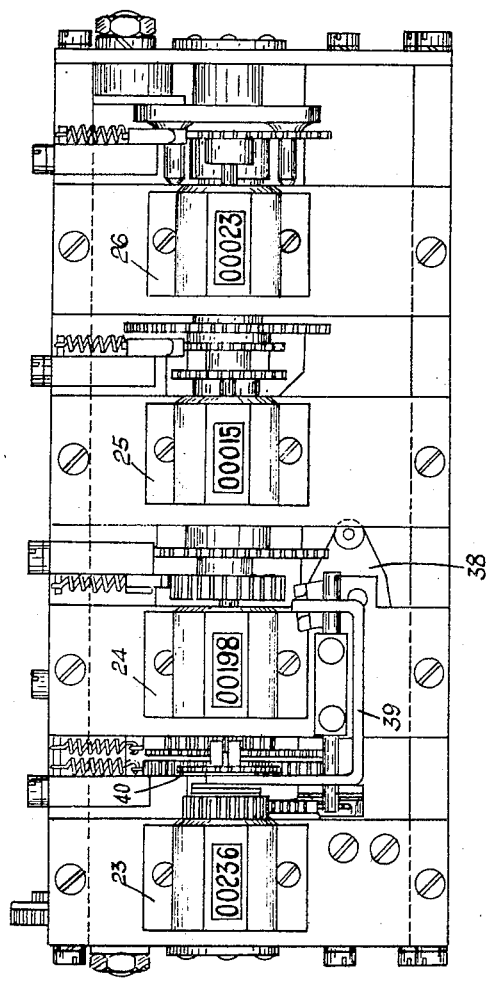

Patented Aug. 25, 1953

2,650,025

UNITED STATES PATENT OFFICE 2,650,025

PLURAL COUNTER SELECTING AND OPERATING MEANS

John Handley, Purley, England, assignor to The Union Totalisator Company Limited, Glasgow, Scotland, a company of Great Britain and Northern Ireland Application November 13, 1948, Serial No. 59,948
In Great Britain November 14, 1947

6 Claims. (Cl. 235—91)

This invention relates to improvements in ticket printing and issuing machines suitable for use with totalisators.

According to the invention, in a ticket printing and issuing machine for totalisators, means is provided to print and issue tickets for a Win and Place or Win, Place and Show bets on the same ticket. Such bets may be of various values and means are provided to register the transaction simultaneously on the counters in the central apparatus of the Win, Place and Show pools, that is, on both the total counters and the competitor counters of the selected competitor.

The value of the bets is registered simultaneously on the Win, Place and Show cash counters of the ticket issuing machine, and twice the number of units are registered on the total cash counter of the ticket issuing machine, that is to say, in sterling currency, a 6/- or three unit Win, Place and Show bet, two shillings (2/-) being the basic betting or transaction unit, would register three units on the Win cash counter, three units on the Place and Show cash counter and six units on the Total cash counter.

It should be explained that as in Great Britain the term "Place" covers the second and third successful competitor, it has been considered convenient to describe the key markings and counters as represented in the drawings in terms of British betting practice.

The machine as described in the specifications of the prior applications Nos. 673,353 and 3,798 (the latter application having issued as Patent No. 2,527,996) has three rows of keys; the back row are stake keys; the middle row are Win, Place and First Selection Forecast, and Field for first place; and the front row are Win and Place competitors, second selection forecast, field for second place and test.

In an existing arrangement according to our pending British patent application No. 30,786/45, now Patent 610,333, accepted October 14, 1948, four competitor keys were added to the row of stake keys to provide for a three cross bet, that is three reversed bets on the forecast pool being made on one ticket.

In the present invention, a further key marked "Win and Place," or "W. and P.," is added to the second row of keys and a further type face engraved "Win and Place" is added to the corresponding type wheel.

When a Win and Place ticket is required for, say, three units on a competitor four, the three unit or 6/- stake key in the back row is depressed, which sets up the 6/- stake type and prepares circuits to operate the three unit stake relays of the Win and Place pools. Then the "Win and Place" key in the second row is depressed which sets up the "Win and Place" type face and operates a relay to prepare circuits to one side of all the Win and Place competitor relays. When the key 4 in the front row is depressed, which sets up competitor 4 type face and prepares circuits to the other sides of competitor 4 "Win and Place" relays, so that, when the ticket is printed and issued, three units are added to number 4 Win and Place competitor counters and the Win and Place total counters.

The machine may incorporate four transaction counters which indicate the value in units of all tickets sold; viz. a Win counter to register all units sold on the Win pool, a Place counter to register all units sold on the Place pool, a Forecast counter to register all units sold on the Forecast pool, and a Total counter to register all units sold on all three pools.

To allow twice the number of units to be registered on the Total counter for a Win and Place bet, a second driving gear associated with the Total counter is geared to rotate at twice the speed of the normal driving gear, and, when a Win and Place ticket is printed and issued, the movement imparted to the type wheels from the Win and Place key causes the total counter to be engaged by the fast running wheel. Both the Win and Place counters are engaged by their normal driving gear for a Win and Place transaction, so that the required units are registered simultaneously on both counters.

Figure 2:
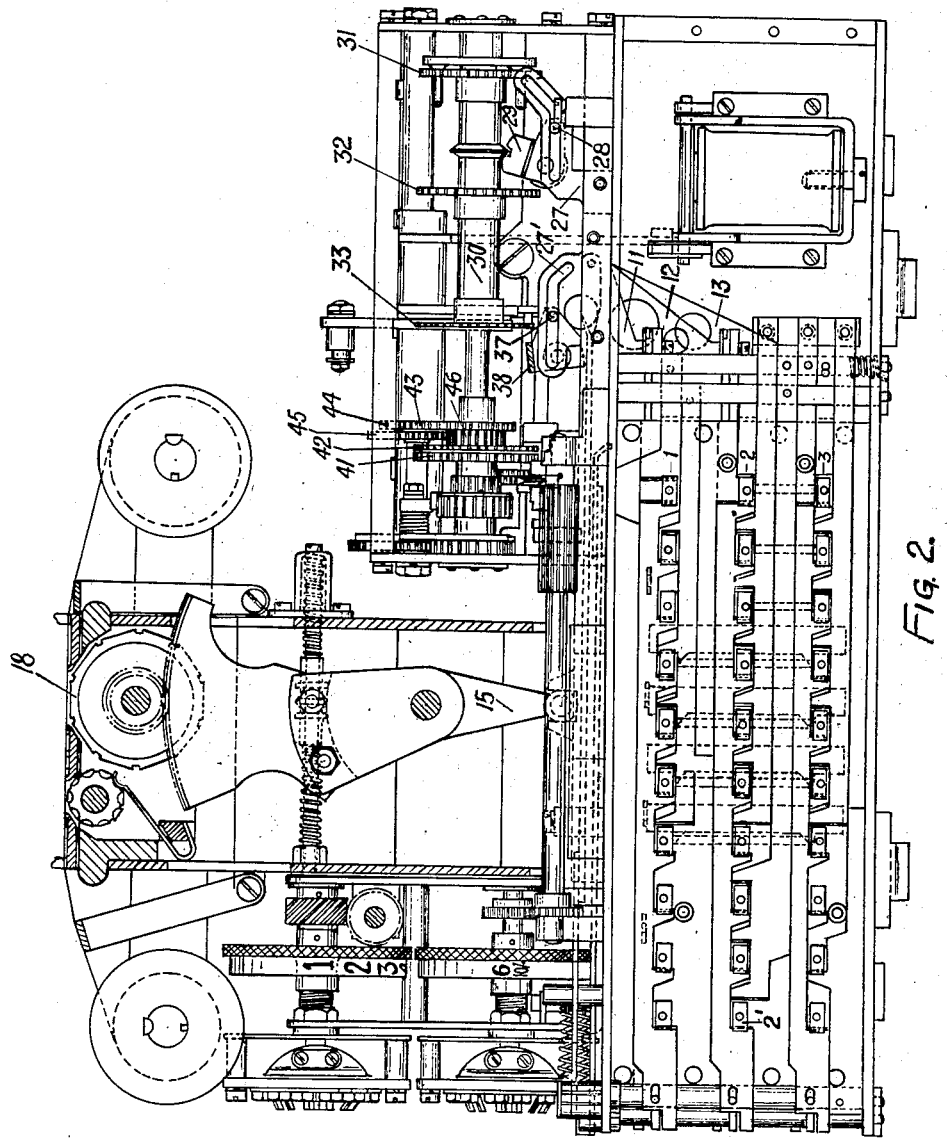
Figure 3:
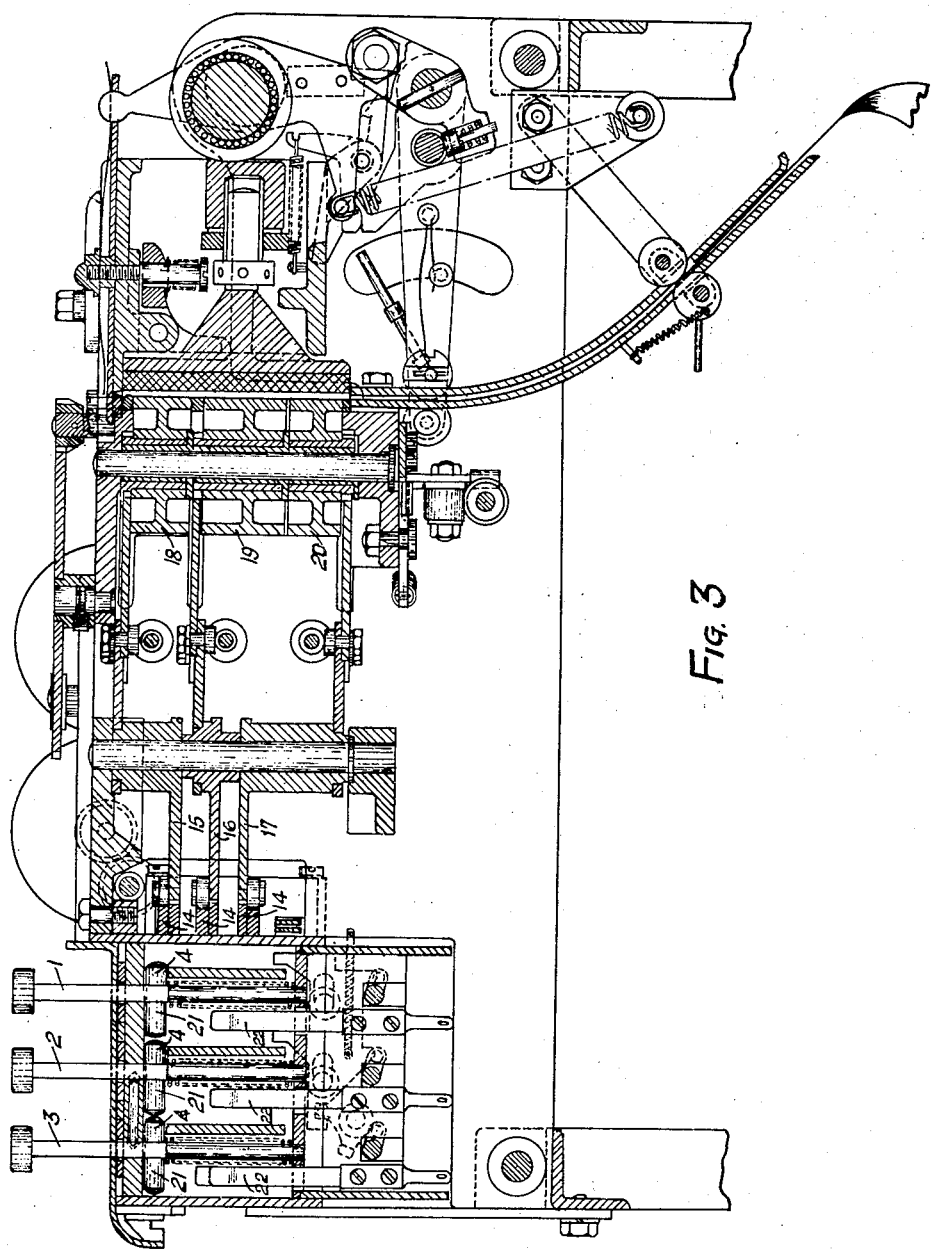
Figure 4:
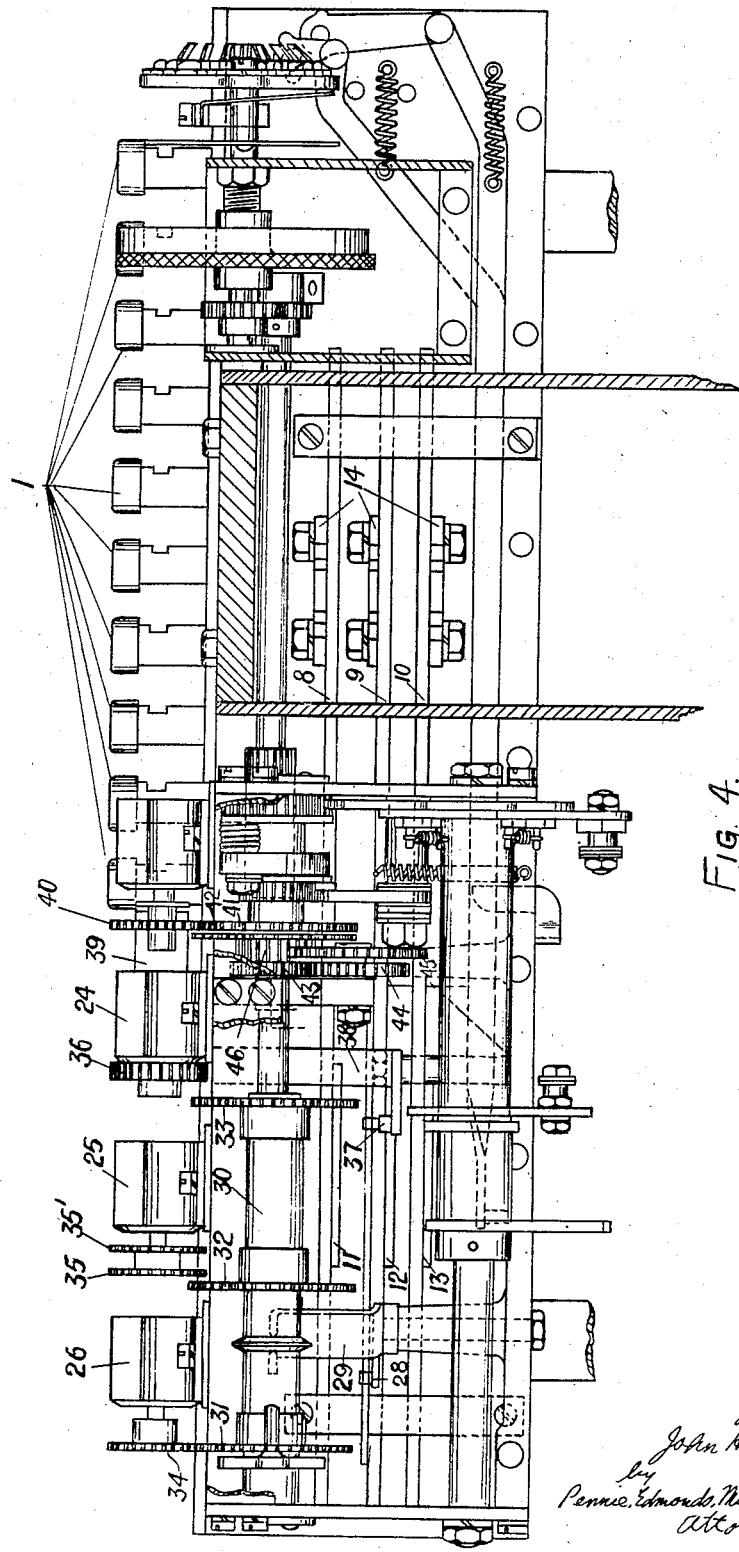

The invention will now be described with reference to the accompanying drawings, in which Fig. 1 is a plan view of the keyboard. Fig. 2 is a plan view of the keybox, counter-operating unit and type selecting mechanism. Fig. 3 is a sectional view showing the keybox, type-selecting mechanism and printing unit. Fig. 4 is a sectional view showing the counter unit from the back, with the four counters mounted on top. Fig. 5 is a plan of the counter unit.

As described in the specifications of the prior applications Nos. 673,353 and 3,798, there are three rows of keys, (1) stake keys, (2) win, place and first selection, forecast and field for first place and win and place key (3) win and place competitors, second selection forecast, field for second place and test.

All the keys carry rollers 4 which when the keys are depressed engage the control bars 5, 6 and 7 and traverse them to the right or to the by engaging in curved slots.

These control bars 5, 6 and 7 are connected to the three slide bars 8, 9 and 10 by fingers 11, 12 and 13, and the slide bars each carry an adjustable fork plate 14 to engage the type wheel sectors 15, 16, 17 to position the stake type wheel 18, the win and place, win, place and first selection forecast type wheel 19, and the win and place competitors or second selection forecast type wheel 20.

All the keys of rows 1, 2 and 3 carry insulated rollers 21 which operate contact springs 22 to close circuits to register bets on the appropriate counters in the central apparatus, by energising stake and competitor relays.

In the case of a normal win bet a battery is applied to one side of all the win competitor relays when the win key is operated and an earth is applied to the other side of say number three win competitor relay when number three key in the lower row is operated, so that number three win competitor relay operates when a bet is sent. If at the same time the 10/- stake key is operated, earths are provided through made contacts on the number three win competitor relay so that a two unit magnet and a three unit magnet operate on the counter to register a (two plus three) that is a five unit or 10/- bet.

When the 10/- stake key, the "place" key and the number three competitor key are operated, a 10/- place bet is registered in a similar manner.

If, however, the 10/- stake key, the "Win and Place" key and the number three competitor key are operated, a battery is applied to one side of all Win and Place competitor relays. Number three Win and number three Place competitor relays will both operate and register a 10/- bet on both number three Win and number three Place counters.

Operation of the Win and Place key 2' rotates the type wheel 19 to print "Win and Place" on the ticket, so that a 10/- Win and Place ticket for competitor three is printed and issued.

To select the appropriate counters on the machine, the total counter 23, win counter 24, place counter 25 and forecast counter 26, the slide bar 9 carries a slotted plate 27 which embraces a pin 28 on a rocker 29 which traverses a sleeve 30 carrying the counter-drive gears 31, 32 and 33.

When keys 1& to 6& and Field& are depressed, the transaction is to be registered on the forecast counter 26, and as the slide bar traverses the plate 27 for these positions the pin 28 remains in the horizontal part of the slot, the rocker is not moved and the gear 31 remains engaged with the forecast counter gear 34.

When the place key is operated, the slide 9 carries the plate 27, Fig. 2, further to the left until the pin 28 is one third of the way along the sloped end of the slot, and the rocker 29 moves the sleeve 30 until the gear 31 is clear of the forecast counter gear 34, Fig. 4, and the gear 32 has engaged the place counter gear 35, Fig. 4, so that the transaction is registered on the place counter 25.

When the Win key is depressed, the sleeve 30 moves further along until the gear 33 is engaged with the Win counter gear 36 and the gear 32 is between the gears 35 and 35' on the Place counter, so that this transaction is registered on the Win counter 24.

When the "Win and Place" key 2' is depressed, the plate 27 is moved still further, so that the gear 35' is engaged by the gear 32, and the gear 33 remains engaged with the gear 36, which latter is a wide gear. Thus, the transaction is registered on both Win and Place counters 24 and 25.

For a Forecast bet, a Win bet or a Place bet, the total counter 23 is actuated by the gear 41 engaging the gear 40 so that all transactions are registered on the total counter 23.

For a "Win and Place" bet the pin 37 on the rocker 38 engaging the slot 27' has been moved by the sloping end of the slot. This moves the fork 39 and traverses the gear 40 out of engagement with the gear 41 and into engagement with the gear 42, which through the gear train 43, 44, 45 and 46 is rotated at twice the speed of the gear 41.

Thus, for a Win and Place bet the transaction is registered on the Win and on the Place counter, and the two transactions are registered on the total counter.

What is claimed is:

1. In a ticket printing and issuing machine for totalisators including keys for selecting a plurality of at least three different classes of transactions, a register mechanism including counters for separately registering the values of such transactions, means for selecting said counters for operation individually and in selected combinations including a slide bar operatively associated with all of said keys for movement in response to operation of any one of said keys, and means carried by said slide bar for selecting the counter or counters to be operated according to the key operated.

2. A ticket printing and issuing machine as claimed in claim 1, in which the means carried by the slide bar includes a plate having a guide slot therein and a member engaged in the slot of said plate and arranged to be positioned thereby for in turn selecting the counter or counters to be operated in accordance with the class key actuated.

3. A ticket printing and issuing machine as claimed in claim 2 in which the guide slot in said plate includes a portion extending in a direction parallel to that of the movement of said slide bar and a second connecting portion extending at an angle to said direction, the said member being adapted to select a single counter when engaged in the first portion of said slot, and adapted to select a plurality of different counters when engaged at respectively different positions in the second portion of said slot.

4. A ticket printing and issuing machine as claimed in claim 1 in which one of said counters is provided with two spaced drive gears and a second counter is provided with a wide drive gear, whereby said one and second counters may be driven singly and also simultaneously.

5. In a ticket printing and issuing machine for totalisators including transaction-selecting keys for win, place, win and place, first selection for forecast and field for first place, a register mechanism including a counter for separately registering the values for win, place and forecast transactions, means for selecting said counters for operation individually and said win and place counters for operation simultaneously, said means including a slide bar operatively associated with all of said keys for movement axially in response to operation of any one of said keys, a plate carried by said slide bar having a guide slot therein, said slot including a portion extending parallel to the direction of movement of said slide bar and a second portion connected with the first portion and extending at an angle thereto, a positionable member engaging in said slot for selecting one of said counters for operation according to the position of said member in said slot, and means responsive to the actuation of the win and place key for selecting the win and place counters for simultaneous operation.

6. A ticket printing and issuing machine as claimed in claim 5 characterized by including a total counter on which all transactions are registered, means for driving the total counter at a given rate when a single one of said counters is being operated, and means responsive to the actuation of the win and place key for connecting-up said total counter for driving it at twice said given rate.

JOHN HANDLEY.

References Cited in the file of this patent

UNITED STATES PATENTS

| Number | Name | Date |
|---|---|---|
| 1,082,957 | Julius | Dec. 30, 1913 |
| 1,273,067 | Julius | July 16, 1918 |
| 1,280,754 | Julius | Oct. 8, 1918 |
| 1,486,438 | Julius | Mar. 11, 1924 |
| 1,896,527 | Houghton | Feb. 7, 1933 |
| 2,155,655 | Handley | Apr. 25, 1939 |
| 2,324,778 | Julius | July 20, 1943 |
| 2,345,212 | Thornton | Mar. 28, 1944 |
| 2,479,681 | Handley | Aug. 23, 1949 |

FOREIGN PATENTS

| Number | Country | Date |
|---|---|---|
| 390,193 | Great Britain | Mar. 20, 1933 |
| 510,441 | Great Britain | July 31, 1939 |
| 572,103 | Great Britain | Sept. 24, 1945 |
| 610,333 | Great Britain | Oct. 14, 1948 |